Nov. 18, 1952 | J. W. CHRISTENSEN | 2,618,701

COLOR TELEVISION SYNCHRONIZING

Filed June 30, 1949 | 3 Sheets-Sheet 1

INVENTOR.
JOHN W. CHRISTENSEN

BY

Pennie, Edmonds, Morton and Barrows
ATTORNEYS

INVENTOR.
JOHN W. CHRISTENSEN
BY
Pennie, Edmonds, Morton and Barrows
ATTORNEYS

COLOR TELEVISION SYNCHRONIZING
Filed June 30, 1949 3 Sheets-Sheet 3
Fig. 6,
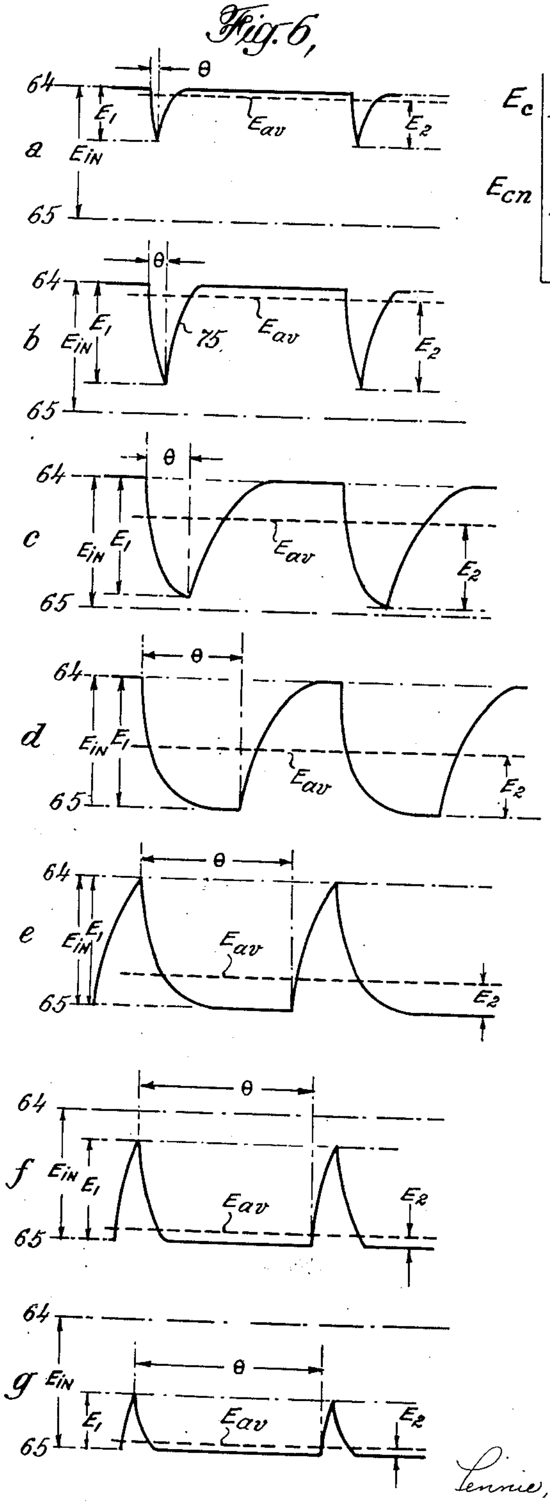
Fig. 7,
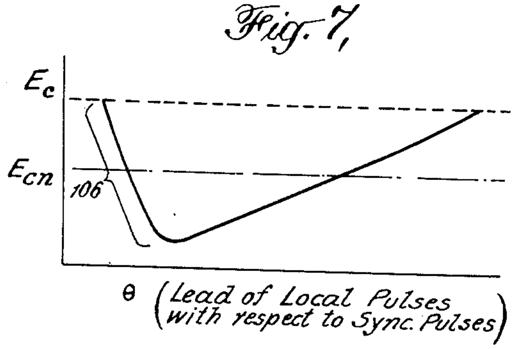
Fig. 5,
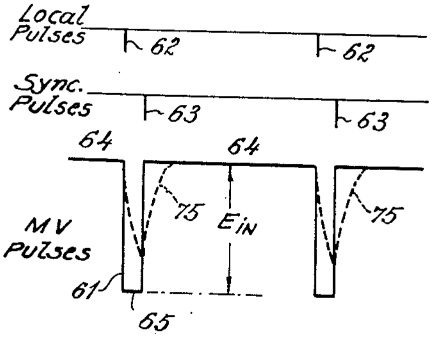
Fig. 8.
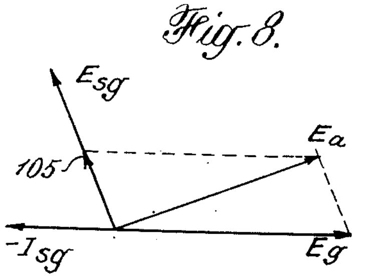
INVENTOR.
JOHN W. CHRISTENSEN
BY
Pennie, Edmonds, Morton and Barrows
ATTORNEYS Patented Nov. 18, 1952

2,618,701

UNITED STATES PATENT OFFICE 2,618,701

COLOR TELEVISION SYNCHRONIZING

John W. Christensen, Forest Hills, N. Y., assignor to Columbia Broadcasting System, Inc., New York, N. Y., a corporation of New York Application June 30, 1949, Serial No. 102,232

23 Claims. (Cl. 178—5.4)

This invention relates primarily to color television, particularly to color television apparatus employing a moving filter element, and provides an improved system for effecting synchronization of the filter. In its broader aspects, however, it can be used for the precise synchronization of apparatus in other fields. In the field of color television, while especially designed and adapted for use in receivers, it can also be applied to transmitters.

In the sequential type of color television system, different primary colors of an object field are successively transmitted and reproduced. At the transmitter, an object field is scanned successively for different primary colors to produce a video signal having successive portions representing different color-separation values. This video picture signal is transmitted along with suitable synchronizing signals in fixed time relationship therewith. The synchronizing signals will ordinarily contain portions for line and field synchronization, and may contain distinctive portions for color synchronization. At the receiver, the different color-separation values represented by the video signal are successively reproduced and exhibited in their respective colors.

Three primary colors are almost universally employed at the present time to secure adequate color fidelity. Commonly, successive field scansions correspond to different primary colors and interlaced scansion is preferred. Such a system has been described in application Ser. No. 355,840, filed September 7, 1940 by Peter C. Goldmark, and has been found satisfactory in practice.

In apparatus a present employed, a moving filter element, such as a rotating disk, drum or similar element, is commonly utilized at the transmitter in cooperation with the scanning device to present different color-separation values successively thereto. At the receiver a similar filer element is employed, usually in cooperation with a cathode-ray receiver tube, to exhibit successive color-separation images in their respective colors. By analogy to the color photographic art, the term "color-separation image" refers to a monochrome image, usually black-and-white, representing a primary color. Such an image may be that of the complete object field to be reproduced, or only a portion thereof.

For proper operation it is necessary that the rotating filter element be in synchronism and correct phase with the transmitting or receiving scanning device employed. Viewing the system as a whole, both transmitting and receiving filter elements must rotate in synchronism and proper phase.

Referring to the receiver for convenience, it is necessary not only for the filter element to rotate in synchronism with the reproduction of successive color-separation images, but also that it be phased with respect to the images so that, say, the red color-separation image will be displayed through the red filter, the green color-separation image through the green filter, etc. This may be termed "color phasing" and is a relatively coarse adjustment. For example, with a disk having six filter segments a change in phase of 60° or multiples thereof suffices for color phasing.

An additional requirement is that the filter segments be properly phased with respect to the line-by-line reproduction of corresponding images, so that as successive lines are reproduced they will be exhibited through the proper color filter. If there is any afterglow or storage effect in the image reproduction, the filter segments must be sufficiently wide and properly phased so that proper color rendition is obtained. This may be termed "color field phasing" of the disk. At the transmitter comparable phase relationships must exist between the filter element and the scanning.

Patents Nos. 2,329,194 and 2,323,905, to Goldmark, disclose various methods and apparatus for synchronizing and phasing a rotating color filter with respect to a scanning device. Patent No. 2,319,789 to Chambers discloses a similar system in which the color phasing is performed automatically.

In Patent No. 2,323,905 the color filter is driven somewhat over synchronous speed by a nonsynchronous motor. A local control wave is generated by the rotation of the filter and its phase compared with that of an incoming synchronizing signal in a phase-comparing circuit. The output of the phase-comparing circuit is supplied to a brake to control the speed of rotation of the filter so as to maintain it in proper synchronism. Other patents have disclosed different means for utilizing a difference in phase between a locally generated wave and an incoming synchronizing wave to effect synchronization.

In these various systems color field phasing of the rotating filter has been accomplished by mechanically adjusting the position of the filter element on its shaft, or by adjusting the position of the stator of the local generator, or by other mechanical means. Patent No. 2,437,690 issued to Peter C. Goldmark discloses means for performing this color field phasing by a variable electrical circuit.

In these prior systems the nonsynchronous motor is commonly energized directly from the power mains so as to avoid generating large amounts of power electronically. Power line voltages vary from area to area, and often fluctuate considerably even at a given location. Thus if a brake is employed, it must be capable of absorbing a large percentage of the available motor power in order to maintain synchronization at the higher line voltages.

While the brake or other means provided for synchronization may be designed to take care of such variations and fluctuations to preserve synchronization, it is clear that the color field phase of the rotating filter with respect to the color-separation images must necessarily change. This is due to the fact that the reproduction of the color-separation images is in synchronism and definite phase with the incoming synchronizing signal, so that the change in phase of the local control signal with respect to the synchronizing signal required to provide proper operating current to the brake or other means results in a shift in phase between the filter element and the images. This may result in improper reproduction of colors over part of the image area, or may make either the lagging or leading edge of a given color filter segment visible to the observer.

Variations in temperature are also found to have a considerable effect on the color field phase. In particular, temperature effects and perhaps other effects appear to cause the driving motor to produce different torques for the same applied voltage under conditions otherwise appearing to be the same. Thus, a synchronizing system which functions satisfactorily for varying line voltages may still be unsatisfactory from day to day due to such temperature effects.

In some systems previously described the synchronizing signal portions used for controlling the rotation of the filter element are at field scanning frequency and special means are required for color phasing. The present tendency is to utilize distinctive color synchronizing signal portions recurring at the frequency of a given color. This avoids the need of additional means for color phasing, but yields a lower synchronizing frequency and hence increases the difficulty of proper color field phasing.

It is a primary object of the present invention to provide means for synchronizing a color filter element and for maintaining a precise phase relationship between the filter element and the field scanning, that is, a precise color field phase, despite considerable variations in line voltage, temperature and synchronizing signal input. Other objects are to provide a system which will rapidly accelerate the filter element to synchronism upon application of power, and reduce to a minimum the time required to synchronize the filter element when changing from station to station. Further objects are to provide a system in which the use of a brake may be avoided, thus avoiding wastage of power in brake and motor, and in which the use of commutators, gears, etc. which might generate electrical interference or mechanical noise is unnecessary.

In accordance with the invention, incoming synchronizing and locally generated signals are applied to a phase-comparing circuit. The phase-comparing circuit is advantageously a multivibrator of the passage type which produces substantially rectangular output pulses whose duration varies with changes in phase between the applied signals. The output of the phase-comparing circuit is supplied to a reactance circuit having a time constant selected to yield a transient response over a substantial range of relative phases of the synchronizing and local signals. Advantageously a resistance-capacitance integrating circuit is employed and the time constant is short compared to the period of the synchronizing signal. The output of the reactance circuit is supplied to an electrical circuit for producing a smoothed control wave whose value varies with the magnitude of the transient response. Advantageously a peak rectifier circuit is employed to produce a smoothed control wave whose value varies with the difference between the average value of the output wave of the reactance circuit and the peak values of one polarity thereof. The resultant smoothed control wave is applied to speed control means for controlling the speed of the nonsynchronous motor. Advantageously a saturable core reactor is employed.

The polarity of the control wave and associated speed control means is selected so that stable synchronization and phase are obtained within the operating range of relative phases of the synchronizing and local control signals for which the reactance circuit yields transient response. The time constant may readily be selected so that very small deviations in phase result in large changes in the smoothed control wave, with resultant large changes in the torque provided by the motor. Hence, very precise color field phase may be maintained regardless of changes in line voltages, temperature, etc.

An anti-hunting circuit is advantageously employed to obtain stability of operation. In accordance with the invention, changes in the smoothed control wave due to hunting are caused to produce a leading wave which is fed back into the control circuit so as to prevent hunting.

The invention will be more fully understood by reference to the specific embodiment illustrated in the drawings and the following description thereof. In the drawings:

Fig. 5 illustrates the development of pulses by the phase-comparing circuit;

Fig. 6 illustrates the output wave form of the reactance circuit under various operating conditions;

Fig. 7 is a representative characteristic curve of the speed control voltage versus phase; and Fig. 8 is a vector diagram relating to the anti-hunting circuit.

Figures 1, 2, 3:
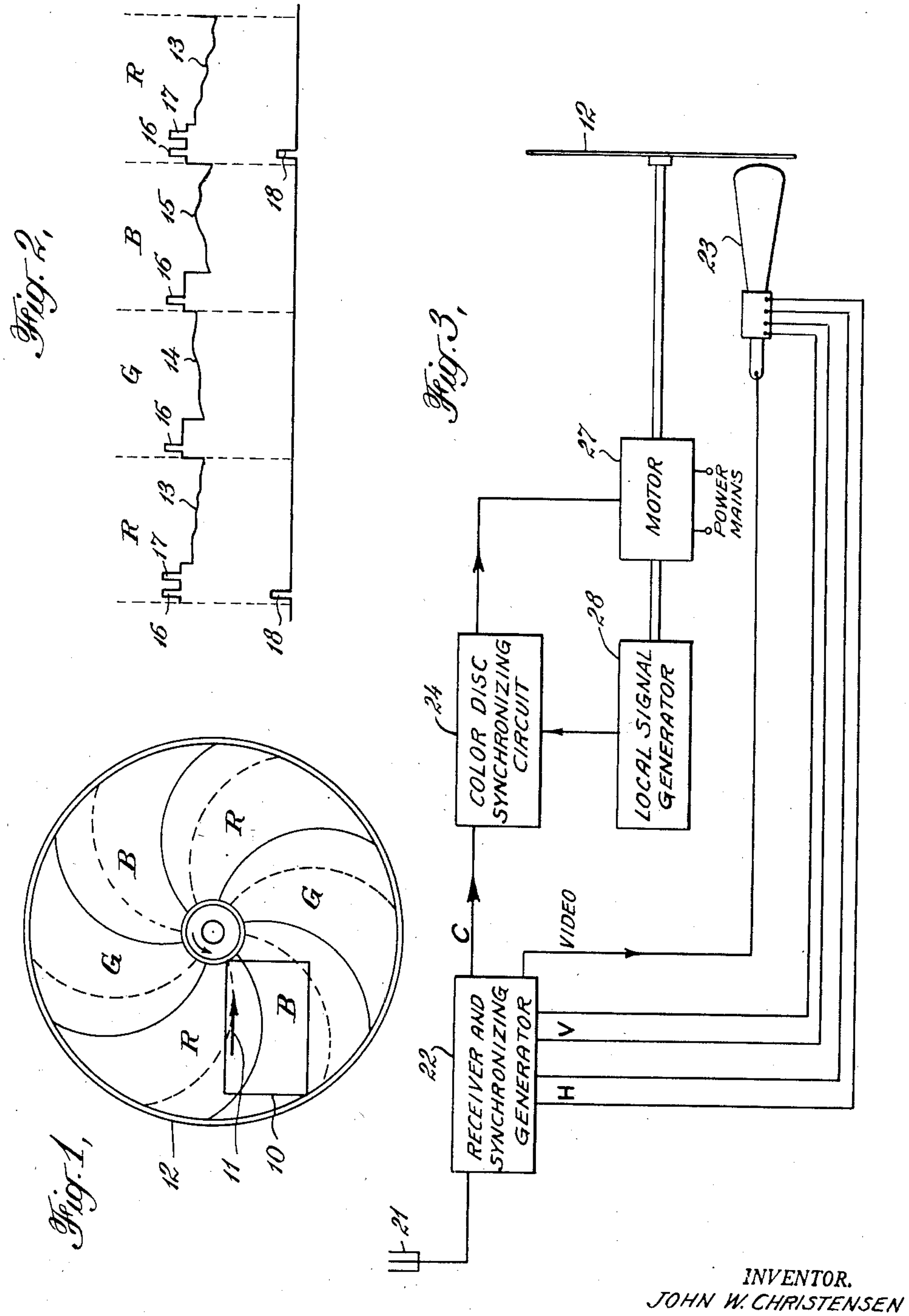
Fig. 1 illustrates proper and improper color field phasing.
Fig. 2 represents a sequential video signal with field and distinctive color synchronizing signal portions.
Fig. 3 is a block diagram illustrating the general arrangement of the apparatus of the invention.

Referring now to Fig. 1, the rectangle 10 represents the reproducing area of a receiver, such as the screen of a cathode-ray tube. Arrow 11 indicates the line being scanned at the instant illustrated. A scanning disk 12 with filters R, G, B rotates in front of the scanning area so as to exhibit successive color-separation images reproduced on the scanning area in their corresponding colors. The segments of filter disk 12 have the configuration described in Patent 2,304,081 to Goldmark, but any other type of disk may be employed as desired. The field scanning is assumed to proceed from top to bottom, and the disk to rotate counterclockwise. It will be understood that a filter drum or other form of filter may be employed instead of a disk. These devices are sometimes called generically "color wheels."

In the position shown in full lines it will be observed that the red filter is phased slightly in advance of line 11 being scanned, and line 11 will be understood to correspond to the red aspect of the image to be reproduced. As scanning proceeds toward the bottom, the red filter will maintain its position slightly in advance so that the lines will be exhibited in the proper color as they are scanned, over the entire image area 10. The width and shape of segment R is such as to allow some afterglow of the scanning lines and still exhibit them through the red filter as long as they remain luminous. When the green color-separation image is beginning to be reproduced by scanning line 11, the green filter segment will be in proper position to exhibit the line therethrough. Thus proper color field phasing is attained.

While considerable latitude in phasing is available by the design of disk 12, the dotted position shows the disk lagging sufficiently to result in an improper color field phase relationship. If scanning line 11 is again assumed to represent a red aspect of the image, it will be observed that a portion of the line is being exhibited through the blue filter, since the red filter is lagging too much behind its proper position. Hence a mixture of blue and red colors will be obtained from line 11, assuming that some afterglow is present. Under stable conditions, this situation may be corrected by rotating filter disk 12 on its axis through the necessary angle, or by other means. However, under changing conditions the disk may sometimes be in correct and sometimes in incorrect color field phase, so that this expedient is insufficient.

It will be understood that if there is considerable variation in the color field phase under various conditions of operation, the color filter disk must be made sufficiently large to provide the necessary margin of safety. On the other hand, if the deviation in color field phase is maintained sufficiently small, a much smaller color filter disk is possible without danger of incorrect reproduction of color. This is very important in order to keep the size of the receiver cabinet as small as possible and to minimize the amount of power required to drive the disk.

Referring now to Fig. 2, a color video signal of the sequential type is shown, having successive portions 13, 14 and 15 representing different color aspects or color-separation values of the object field, as indicated by the letters R (red), G (green), B (blue). Successive portions are assumed to represent successive field scansions which may be interlaced as mentioned hereinbefore. The video signal also has a synchronizing signal associated therewith in fixed time relationship. This signal includes pulses 16 provided for field synchronization. These are shown as single pulses for convenience, but are ordinarily groups of pulses and may be of any desired form known in the art. While the field synchronizing pulses 16 may be used alone for color synchronization, Fig. 2 shows additional distinctive pulses 17 accompanying each red color field which may be used by themselves for color synchronization, or may be used in conjunction with the field synchronizing pulses 16 for color synchronization. Again, color pulses 17 are shown as single pulses for convenience, but are ordinarily groups of pulses capable of convenient separation. The line synchronizing pulses of the synchronizing signal are not shown in Fig. 2 since it is impracticable.

Pulses 18 are derived in any desired manner from the color synchronizing pulses 17 and recur at the frequency of fields of one color, here shown as red. The duration of the pulses may vary over fairly wide limits, but are advantageously short compared to the field period. Also, the phase between the derived color synchronizing pulses 18 and the initial pulses 17 may be quite different from that illustrated, it being important only that pulses 18 have a definite phase relation with the initiating pulses 17.

Referring now to Fig. 3, a color video signal of the sequential type having a synchronizing signal therewith, like that of Fig. 2 or any other suitable type, is received by antenna 21 and supplied to the receiver and synchronizing generator 22. In 22 the incoming signal is amplified and detected, and the video supplied to the control grid of cathode-ray tube 23. The line and field synchronizing pulses of the synchronizing signal are employed to control the generation of horizontal (H) and vertical (V) sawtooth scanning waves which are supplied to the deflecting coils or plates of the cathode-ray tube. Thus the reproduction of the color-separation images will be in synchronism and bear a definite phase relationship with the synchronizing signal.

Either the field synchronizing pulses, or distinctive color synchronizing pulses, or both, may be supplied from 22 to the color disk synchronizing circuit 24. In the following detailed discussion it will be assumed that color synchronizing pulses recurring at the frequency of a given color, such as pulses 18 in Fig. 2, are supplied to synchronizing circuit 24. Modifications required in the event that the other synchronizing signals are supplied will be apparent to those in the art.

Color filter 12 is driven by nonsynchronous motor 27 energized from a suitable source of power here shown as the power mains. A generator 28 is driven synchronously with the color filter disk and generates a local signal wave whose frequency varies with the speed of rotation of the color filter disk 12 and is advantageously equal to that of the synchronizing signal when the disk is rotating at synchronous speed. The output of the local signal generator 28 is supplied to disk synchronizing circuit 24. In 24 the phases of the synchronizing and local signals are compared and a control wave derived in a manner to be described in connection with Fig. 4. This control wave is used to control the speed of motor 27.

Figure 4:
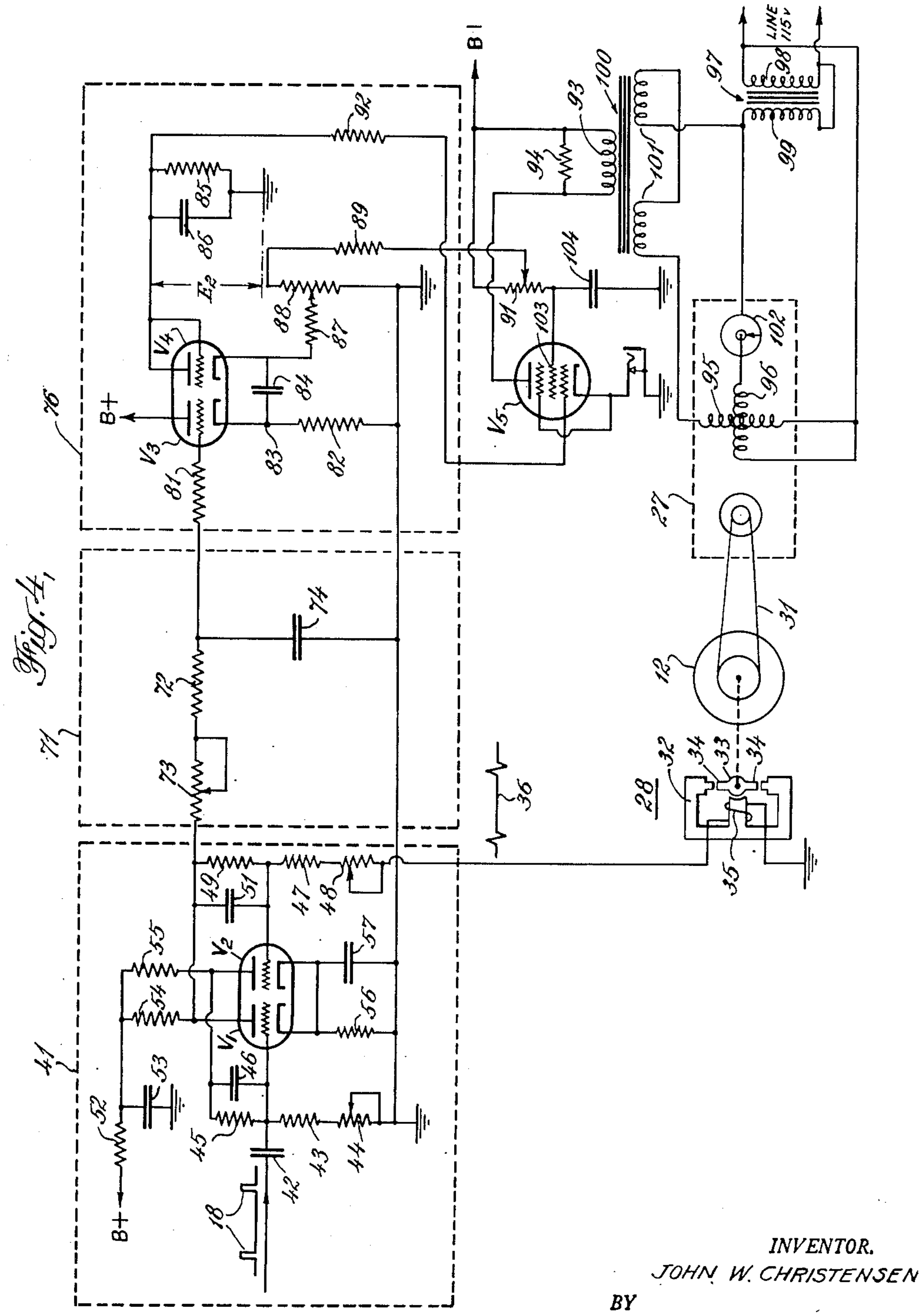
Fig. 4 is a circuit diagram of a specific embodiment of the invention.

Referring now to Fig. 4, a nonsynchronous motor generally designated as 27 drives color filter disk 12 through a belt drive 31. A local generator 28 is driven simultaneously with the disk 12, preferably by being mounted on the same shaft. Generator 28 is here shown as a magneto of the variable reluctance type having a two-pole W-type stator 32 and a permanent magnet rotor 33. For a filter disk having two sets of color filters and synchronizing pulses recurring at the frequency of filters of one color, rotor 33 has two poles 34. These cooperate with corresponding pole pieces of stator 32 to generate pulses having the periodicity of the synchronizing pulses at synchronous speed. Advantageously the rotor poles and the stator pole pieces are very narrow in the direction perpendicular to the axis of rotation so as to give very narrow pulses. The pulses are generated in winding 35 and have the form shown generally at 36. These local control pulses are supplied to the phase-comparing circuit shown generally as 41. Input synchronizing pulses 18 are likewise supplied to the phase-comparing circuit.

Phase-comparing circuit 41 is shown specifically as a multivibrator of the passive type. Synchronizing pulses 18 are applied to the grid of tube V–1 through coupling capacitor 42 and fixed and variable resistors 43 and 44. The grid of tube V–1 is connected to the plate of tube V–2 by resistor 45 shunted by a small capacitor 46. The local signal pulses 36 are supplied to the grid of tube V–2 through fixed and variable resistors 47 and 48. The grid of tube V–2 is connected to the plate of tube V–1 by means of resistor 49 shunted by a small capacitor 51. Plate voltage is supplied from a suitable B+ source through a decoupling resistor 52 shunted by a large capacitor 53, and plate load resistors 54 and 55 of respective tubes. Suitable cathode bias is provided by resistor 56 shunted by capacitor 57.

In operation, the negative portions of the local signal pulses 36 cut off tube V–2. The consequent rise in plate potential of V–2 raises the grid potential of tube V–1 and causes that tube to conduct. Capacitor 46 is provided to insure proper operation with very short local signal pulses, since it forms a capacity divider with the input capacitance of tube V–1. When a subsequent, synchronizing pulse 18 arrives it turns tube V–1 off, thus raising the anode potential of tube V–1 and cutting off tube V–2. Capacitor 51 is again helpful in securing reliable operation for very short pulses by forming a capacity divider with the input capacitance of tube V–2. Since tubes V–1 and V–2 conduct alternately, a single cathode resistor 56 suffices for proper bias. However, it is helpful to shunt resistor 56 by capacitor 57 to avoid any transient changes in cathode bias in switching from one tube to the other.

The input synchronizing pulses 18 may be of either positive or negative polarity. If of negative polarity, tube V–1 is cut off by the leading edge of a pulse in the usual fashion. With positive polarity pulses as shown, when a pulse arrives capacitor 42 is quickly charged through the grid-cathode path of tube V–1, and the trailing edge of the pulse 18 drives the grid negative to cut off the tube. The slight difference in phase which results from using positive instead of negative synchronizing pulses 18 may be taken into account in positioning the color disk 12 on its shaft.

The output of the phase-comparing circuit is taken from the plate of V–1 and the waveform is shown in Fig. 5. It is here assumed that the effective negative portions 62 of the local signal wave 36 lead the effective negative pulses 63 corresponding to the trailing edges of synchronizing pulses 18. With tube V–1 initially cut off, the plate is at B+ potential shown at 64. As explained above, an input local negative pulse 62 cuts off tube V–2 and consequently causes V–1 to conduct. The plate voltage of V–1 decreases to the level represented at 65, due to the flow of plate current in resistor 54. When a subsequent synchronizing pulse arrives, the effective negative pulse 63 turns tube V–1 off and causes its plate potential to return to its original value 64. The magnitude of the resultant output pulses is represented by $E_{in}$. The negative pulses 61 are substantially rectangular in form and has a duration determined by the relative phase of pulses 62 and 63, that is, by the relative phase of the synchronizing and local signal pulses. This wave is supplied to a short time constant reactance circuit here shown as an integrating circuit designated generally as 71. The integrating portions consist of fixed and variable resistors 72, 73 and capacitor 74.

The phase-comparing circuit has been shown and described as a multivibrator of the passive type. Such a circuit gives stable operation with a plate voltage varying over a considerable range, and can be triggered reliably by pulses varying considerably in amplitude. It also has the important advantage that output pulses of substantially rectangular waveform and large amplitude are easily obtained, pulses 61 of about 150 volts having been successfully used in practice. However, it will be understood that other types of phase-comparing circuits can be employed if desired.

When the voltage applied to the integrating circuit 71 is changed suddenly from one value to another, a short time elapses before the voltage across the capacitor reaches substantially the value of the applied potential. This interval is herein termed the period of transient response, and is determined by the time constant RC of the circuit. Advantageously the time constant is small compared to the period of the synchronizing signal pulses, but is sufficiently large to yield transient response for pulse lengths corresponding to a substantial operating range of relative phases of synchronizing and local signals. As an example for illustration only, an integrating circuit having a time constant variable from about 750 to 2000 microseconds has been employed satisfactorily with color synchronizing pulses recurring at the rate of 48 per second, hence having a period of about 20,000 microseconds.

Considering the output wave of Fig. 5, if the voltage shown at 64 has been applied for a sufficient length of time the voltage across capacitor 74 is substantially the same value. If then the applied voltages is changed suddenly to the lower level shown at 65, the condenser discharges along a curve determined by the time constant of the circuit. If the applied voltage remains constant at the value shown at 65 for a long enough interval, the voltage across capacitor 74 becomes substantially equal to the value represented by 65. On the other hand, if the applied voltage returns to the value shown at 64 before the voltage on condenser 74 reaches its final stable value, a curve such as is shown in dotted lines 75 is obtained. This shows an incomplete changing of voltage on capacitor 74 due to the period of transient response being greater than the pulse length.

Fig. 6 shows the voltage wave across capacitor 74 for various phase relationships between the local and synchronizing pulses. The angle by which the local pulses 62 lead the synchronizing pulses 63 is denoted $\theta$. In Fig. 6(*b*) the phase $\theta$ is the same as that shown in Fig. 5. It will be observed that the peak-to-peak value $E_1$ of the wave 75 is less than the magnitude $E_{in}$ of the applied rectangular pulses since the period of transient response of the integrating circuit is greater than the duration of the pulses and consequently the capacitor 74 does not reach the full potential of the applied pulses. In Fig. 6(*a*) the phase angle $\theta$ is less than that shown in Fig. 6(*b*)

and the peak-to-peak value $E_1$ is less. Figs. 6(*c*)–6(*g*) show increasing values of $\theta$. In Figs. 6(*d*) and 6(*e*) the rectangular pulses are sufficiently long compared to the time constant of the integrating circuit so that the peak-to-peak voltage $E_1$ across the condenser 74 is substantially that of the applied pulses. For still greater values of $\theta$, as shown in Figs. 6(*f*) and 6(*g*) insufficient time is allowed for capacitor 74 to recharge between one synchronizing pulse and the next succeeding local pulse, so that $E_1$ decreases.

The output of the integrating circuit is supplied to a peak rectifying circuit shown generally as 76. The voltage waves across capacitor 74 are applied through grid resistor 81 to the grid of tube section V–3 connected as a cathode follower. The plate of tube V–3 is connected to a suitable B+ source and the cathode is connected to ground through cathode resistor 82. The voltage waves at point 83 are the same as those shown in Fig. 6 but with slightly reduced amplitude. The waves are then supplied through coupling capacitor 84 to the cathode of tube V–4 connected as a peak rectifier. The grid and plate of tube V–4 are connected together to an output circuit comprising resistor 85 and shunting capacitor 86. An adjustable bias is applied to the cathode of tube V–4 through resistor 87 and potentiometer 88. The latter is connected through resistor 89 and potentiometer 91 to a source of B+. The resistance of potentiometer 88 and resistor 89 are advantageously made very high compared to that of potentiometer 91, so that the voltage drop across potentiometer 88 is substantially independent of the setting of potentiometer 91. In this manner the adjustable bias applied to the cathode of V–4 is substantially independent of the setting of potentometer 91. An anti-hunting voltage wave is fed back from potentiometer 91 to the cathode of tube V–4 and will be described later.

Disregarding the anti-hunting feed-back voltage wave for the moment, the operating bias of the cathode of V–4 is determined by the setting of potentiometer 88. The output voltage wave 75 from the intergrating circuit is fed to the cathode through coupling condenser 84 which eliminates the D.-C. component. The average or D.-C. value of voltage wave 75 is shown in Figs. 6(*a*) through 6(*g*) by the broken line $E_{av}$. This average value coincides with the operating bias applied to the cathode of V–4, and the wave 75 swings negatively and positively with respect to the average value. Tube V–4 is connected to pass the negative portions of wave 75. Consequently the output voltage of the rectifier, denoted $E_2$, varies according to the difference between the average value of wave 75 and the negative peak value. This is shown in Fig. 6 and denoted $E_2$. As $\theta$ increases from a relatively small value, $E_2$ increases rapidly to a maximum value and thereafter decreases.

The time constant of the rectifier output circuit 85, 86 is advantageously large enough to hold the charge on the capacitor 86 between successive negative peaks of wave 75, but should not be too long since that would decrease the speed with which the color disk is brought into synchronism. Actually, it has been found advantageous to employ a time constant of the order of twice the period of the synchronizing pulses. This allows some decay of charge across capacitor 86 between successive negative pulses of wave 75 and is a compromise between providing a very smooth control wave and avoiding too much delay in bringing the disk into synchronization. The resultant wave is fed through resistor 92 to the grid of tube V–5 which controls the motor speed.

It should be noted that the rectangular pulses from multivibrator 41, although extending in a negative direction, are at all times positive to ground potential. Hence the voltage across capacitor 74 is at all times positive and the output of cathode follower V–3 is at all times positive to ground. The use of a negative peak rectifier V–4, with positive cathode bias and A.-C. coupling between the cathode follower and the rectifier, permits obtaining a control voltage at the grid of tube V–5 which is negative to ground. This is accomplished without resorting to separate power supplies to furnish bias, and without additional circuit complications. This is an important feature of the invention. The cathode follower also prevents loading of the integrating circuit by the rectifier.

The speed control circuit for motor 27 includes the saturable core reactor 100 having its D.-C. control winding 93 in the plate circuit of tube V–5. Resistor 94 shunts winding 93 to protect the winding in case of open circuit or very rapid cut-off of tube V–5.

Motor 27 is here shown as a nonsynchronous induction motor having a running coil 95 and a starting coil 96. The motor is energized from the usual 115 volt power line through transformer 97 having a primary 98 and secondary 99. The motor is designed for normal operation from a 115-volt line and secondary 99 is connected in series with primary 98 so as to provide a higher-than-line voltage to compensate for the drop through windings 101 of the saturable core reactor. The running winding 95 of the motor is supplied with this higher-than-line voltage through windings 101. Starting winding 96 is supplied with the higher-than-line voltage through centrifugal switch 102.

In operation, the plate current of tube V–5 is controlled by the smoothed control wave from rectifier V–4 and flows through D.-C. winding 93 to control the inductive drop through the reactor 100. This in turn controls the voltage applied to motor 27 to vary the speed thereof.

In systems of this character where a variation in speed or phase of motor 27 produces a control wave which acts to correct the speed or phase, a tendency to hunt is often present. This is due to the various time delays around the control circuit which cause the correcting wave to lag with respect to the color disc phase error. A resulting hunting oscillation of the color filter disk occurs at a frequency determined by the mechanical inertia of the system, the magnitude and phase of the correcting voltage, the change of torque of the motor, etc. This is termed the "hunting cycle." In order to prevent hunting, a voltage is derived from the control wave which varies with the control wave at the frequency of the hunting cycle but is leading with respect thereto. This leading voltage is fed back so as to reduce the overall phase lag to a value at which hunting disappears. Inasmuch as there is always some damping present in the form of mechanical friction, electrical dissipation, etc., it is not necessary to reduce the phase lag to zero. However, a phase lag of zero, or even a leading control voltage will avoid hunting, although it will tend to increase the time required for the color filter disk to reach its stable operating speed and phase.

In Fig. 4 a leading anti-hunting voltage is derived from the screen grid circuit of tube V–5. Screen grid 103 is supplied with voltage from the B+ source through potentiometer 91 shunted by capacitor 104. The operation will be clearer by referring to the vector diagram of Fig. 8. The grid voltage is shown as vector $E_g$. The resulting screen grid current is shown by vector $-I_{sg}$. The magnitude and phase of the resulting screen grid voltage $E_{sg}$ will be determined by the relative magnitudes of resistor 91 and capacitor 104. The vector $E_{sg}$ in Fig. 8 shows one relationship for purposes of example.

A portion of the resulting screen grid voltage wave is selected by means of potentiometer 91 and indicated by arrow 105 in Fig. 8. This voltage is fed back through resistor 89, potentiometer 88 and resistor 87 to the cathode of tube V–4. It is hence combined with the input voltage to tube V–4 and reappears in its output along with voltage $E_g$. These voltages are added and result in a voltage $E_a$ (Fig. 8) which leads the original voltage $E_g$. It will therefore be seen that as $E_g$ varies in accordance with the hunting cycle, a voltage $E_a$ is produced which is similar to $E_g$ but leads it. Therefore, insofar as the hunting cycle is concerned, the leading voltage $E_a$ counteracts the effects of phase delay throughout the circuit and prevents motor 27 from hunting.

The magnitude of the leading voltage may be determined by the setting of potentiometer 91 and is advantageously chosen to just prevent hunting. Over-compensation is ordinarily not desirable since it slows down the speed with which the color filter disk is brought into synchronism and the speed with which errors in phase are corrected. It should be understood that when stable synchronism and phase are obtained, the hunting oscillation ceases so that $E_g$ remains at a constant value and no leading component is produced. If, however, at any time there is a tendency of the disk to hunt, the leading voltage is produced and counteracts such tendency.

The overall operation of the circuit will now be described. Upon application of power, both windings of the motor 27 are energized and the color filter disk is accelerated to slightly less than synchronous speed. At this time the centrifugal cut-out switch 102 opens, leaving the motor operating only on its running winding 95. The disk continues to run at slightly less than synchronous speed until the vacuum tubes have heated sufficiently to saturate the reactor. If there are no synchronizing pulses 18 present, a negative local pulse from generator 28 causes vacuum tube V–1 to conduct and the tube continues to conduct. There is hence no A. C. voltage applied to the rectifier. Since the cathode of tube V–4 is somewhat above ground potential, there is no output voltage from rectifier V–4 and the grid of V–5 is at ground potential. This results in maximum plate current through tube V–5, maximum D. C. current through coil 93 of the saturable core reactor, and minimum inductive drop in coils 101 of the reactor. As a result, maximum voltage is applied to running winding 95 of the motor and the filter disk is driven above synchronous speed.

When a television signal is received, synchronizing pulses 18 are applied to the phase-comparing circuit 41. These actuate at the multivibrator to develop pulses which in turn produce an A. C. wave which is applied to the cathode of the tube V–4. The resulting rectified current produces a negative output voltage which is applied to the grid of tube V–5 and reduces the plate current. This decreases the D. C. current through the saturable reactor 100 and decreases the voltage applied to the motor, thus decelerating the disk to synchronous speed. If the television signal is present at the time the control circuit tubes become operative, the disk is accelerated to synchronism without overspeed operation.

Potentiometer 88 serves as a centering control and is advantageously adjusted so that during synchronism the motor control is operating at the center of its phase-voltage characteristic. A representative characteristic is shown in Fig. 7, where $E_c$ represents the control voltage applied to the grid of V–5. The normal operating point is denoted $E_{cn}$. Under these conditions an increase or decrease in disk phase shift produces a proportional decrease or increase in motor voltage. If the centering control is set to a point at which the normal grid voltage of tube V–5 is too negative, the time required for the disk to accelerate to synchronism is increased. Conversely, if the grid is not sufficiently negative, the deceleration time is increased.

Potentiometer 73 determines the time constant of integrating circuit 71 and is termed the "stiffness control." Shortening the time constant increases the slope of the stable portion 106 of the curve of Fig. 7 and tends to maintain a very rigid phase relationship of the filter disk. With excessive stiffness, the inertia of the filter disk and associated rotating elements may cause the disk to pass over the narrow stable equilibrium portion of the curve so rapidly that the disk can not lock into steady synchronism. Insufficient stiffness, on the other hand, causes excessive phase shift with variable line voltage and/or temperature, etc.

During the time required for the disk to accelerate or decelerate to synchronism, there is a short period of rapid slipping of the disk past its correct phase. Under such conditions the control wave $E_c$ may be considered to repeatedly traverse the curve of Fig. 7, and the average value of the control wave approaches the normal value for maintaining synchronism. Thus the effect of the control wave is to bring the disk to approximately synchronous speed and this action facilitates pulling the disk into precise phase on the stable operating portion 106 of the characteristic. The A. C. coupling to rectifier V–4 provided by capacitor 84 promotes this operation by preventing the control voltage $E_c$ from assuming a constant negative value at the lowest point of the characteristic. Such a negative value would provide too low a voltage to the motor and hence would tend to cause the motor to drop out of synchronism.

As before stated, the anti-hunting control potentiometer 91 is advantageously adjusted to the point at which hunting of the disk just ceases. An excessive amount of anti-hunting feed-back may result in impairment of the pull-in characteristics.

As an example of the type of results which may be obtained with the circuit described herein, in one specific embodiment it was found that the phase angle remained within approximately $\pm 2°$ over a wide temperature range with variations of line input voltage between 100 and 130 volts and with color pulse peak input voltages varying between 2 and 15 volts. With maximum stiffness, a 1° disk phase error caused a change of approximately 8 volts in the output of the rectifier, and a corresponding change in the voltage supplied to the motor of approximately 20 volts. With minimum stiffness, control and motor voltages were approximately 3 volts and 7 volts, respectively. The approximate elapsed time between switching on the A.-C. power and complete color disk synchronization was 15 seconds. After the equipment had reached normal operating conditions, the time between application of color pulses and complete disk synchronization was approximately 1.5 seconds.

It will be apparent from the foregoing that the present invention provides a synchronizing system which is simple and reliable in operation and maintains the color field phase between color filter and image reproduction within very close limits despite wide variations in line voltage, temperature, etc. The multivibrator provides substantially rectangular output pulses of large magnitude and is capable of operating reliably with considerable variation in amplitude of the applied synchronizing pulses. The use of the short time-constant integrating circuit 71 with subsequent peak rectification utilizes the region of transient response of the integrating circuit as the stable synchronizing region. Since the portion of the operating characteristic corresponding to this transient response region can be made very steep, considerable variation in operating conditions produce only small variations in the color field phase. The arrangement of the peak rectifying circuit 75 provides a simple means for obtaining a negative control voltage as explained above. The anti-hunting circuit is likewise very simple and efficacious.

The invention has been described in connection with a specific embodiment thereof. It will be apparent to those skilled in the art that many modifications are possible within the spirit and scope of the invention. While especially designed and adapted for use in color television systems, the invention may also be applied to other systems where precise synchronization with small phase deviation is important.

I claim:

1. In a color television system employing a scanning device operating in synchronism with a synchronizing signal of predetermined periodicity, and a cooperating movable color filter element, apparatus for effecting synchronization therebetween which comprises a nonsynchronous motor driving said color filter element and a generator actuated therewith to produce a local signal of periodicity varying with the filter element speed, a reactance circuit having substantial resistance associated therewith, a phase-comparing circuit supplied with said synchronizing and local signals and responsive to changes in phase therebetween to control a voltage applied to said reactance circuit, the reactance circuit having a time constant to yield transient response over a substantial range of relative phases of said signals, an electrical circuit fed from said reactance circuit for producing a smoothed control wave whose value varies with the magnitude of said transient response over said range of phases, and speed control means supplied with said smoothed control wave for controlling the speed of said motor, whereby synchronism between scanning device and color filter element may be maintained with small phase deviation.

2. In a color television system employing a scanning device operating in synchronism with a synchronizing signal of predetermined periodicity, and a cooperating movable color filter element, apparatus for effecting synchronization therebetween which comprises a nonsynchronous motor driving said color filter element and a generator actuated therewith to produce a local signal of said predetermined periodicity at synchronous speed, a reactance circuit having substantial resistance associated therewith, a phase-comparing circuit supplied with said synchronizing and local signals and adapted to apply and remove a voltage from said reactance circuit in accordance with the time phases of said signals, the reactance circuit time constant being shorter than the synchronizing signal period and yielding transient response over a substantial range of relative phases of said signals, an electrical circuit fed from said reactance circuit for producing a smoothed control wave whose value varies with the magnitude of said transient response over said range of phases, and speed control means supplied with said smoothed control wave for controlling the speed of said motor, whereby synchronism between scanning device and color filter element may be maintained with small phase deviation.

3. In a color television system employing a scanning device operating in synchronism with a synchronizing signal of predetermined periodicity, and a cooperating movable color filter element, apparatus for effecting synchronization therebetween which comprises a nonsynchronous motor driving said color filter element and a generator actuated therewith to produce a local signal of said predetermined periodicity at synchronous speed, a phase-comparing circuit supplied with said synchronizing and local signals and adapted to generate a substantially rectangular voltage wave whose duty cycle varies with changes in phase between said signals, a reactance circuit having substantial resistance associated therewith, said reactance circuit being supplied with said voltage wave and having a time constant yielding transient response over a substantial range of relative phases of said signals, an electrical circuit fed from said reactance circuit for producing a smoothed control wave whose value varies with the magnitude of said transient response over said range of phases, and speed control means supplied with said smoothed control wave for controlling the speed of said motor, whereby synchronism betweeen scanning device and color filter element may be maintained with small phase deviation.

4. In a color television system having a scanning device operating in synchronism with synchronizing signal pulses of predetermined periodicity, and a cooperating movable color filter element, apparatus for effecting synchronization therebetween which comprises a nonsynchronous motor driving said color filter element and a pulse generator actuated therewith to produce local signal pulses of periodicity varying with the speed thereof and of said predetermined periodicity at synchronous speed, a phase-comparing circuit supplied with said synchronizing and local signal pulses and adapted to generate substantially rectangular pulses whose duration varies with changes in phase between said signal pulses, a reactance circuit having substantial resistance associated therewith, said reactance circuit being supplied with said rectangular pulses and having a time constant yielding transient response for pulse durations corresponding to a substantial range of relative phases of said signal pulses, an electrical circuit fed from said reactance circuit and adapted to produce a smoothed control wave whose value varies with the magnitude of said transient response over said range of phases, and speed control means supplied with said smoothed control wave for controlling the speed of said motor, whereby synchronism between scanning device and color filter element may be maintained with small phase deviation.

5. In a color television system having a scanning device operating in synchronism with synchronizing signal pulses of predetermined periodicity, and a cooperating movable color filter element, apparatus for effecting synchronization therebetween which comprises a nonsynchronous motor driving said color filter element and a pulse generator actuated therewith to produce local signal pulses of periodicity varying with the speed thereof and of said predetermined periodicity at synchronous speed, a phase-comparing circuit supplied with said synchronizing and local signal pulses and adapted to generate substantially rectangular pulses whose duration varies with changes in phase between said signal pulses, a reactance circuit supplied with said rectangular pulses and having a time constant short compared to the period of said synchronizing pulses but sufficiently long to yield transient response for pulse durations corresponding to a substantial range of relative phases of said signal pulses, a rectifier circuit fed from said reactance circuit and adapted to produce a smoothed control wave whose value varies with the magnitude of the transient response over said range of phases, and speed control means supplied with said smoothed control wave for controlling the speed of said motor, whereby synchronism between scanning device and color filter element may be maintained with small phase deviation.

6. In a color television system employing a scanning device operating in synchronism with a synchronizing signal of predetermined periodicity, and a cooperating movable color filter element, apparatus for effecting synchronization therebetween which comprises a nonsynchronous motor driving said color filter element and a generator actuated therewith to produce a local signal varying with the speed thereof and of said predetermined periodicity at synchronous speed, a phase-comparing circuit supplied with said synchronizing and local signals and adapted to generate substantially rectangular pulses whose duration varies with changes in phase between said signals, a reactance circuit supplied with said rectangular pulses and having a time constant short compared to the period of said synchronizing pulses but sufficiently long to yield transient response for pulse durations corresponding to a substantial range of relative phases of said signals, a peak rectifier circuit responsive to the difference between the average value of a wave applied thereto and peak values of one polarity thereof, connections supplying the output of said reactance circuit to said rectifier circuit to obtain a control wave, and speed control means supplied with said control wave for controlling the speed of said motor, whereby synchronism between scanning device and color filter element may be maintained with small phase deviation.

7. In a color television system employing a scanning device operating in synchronism with synchronizing signal pulses of predetermined periodicity, and a cooperating movable color filter element, apparatus for effecting synchronization therebetween which comprises a nonsynchronous motor driving said color filter element and a generator actuated therewith to produce local signal pulses of periodicity varying with the speed thereof and of said predetermined periodicity at synchronous speed, a phase-comparing circuit supplied with said synchronizing and local signal pulses and adapted to generate substantially rectangular voltage pulses whose duration varies with changes in phase between said signal pulses, a reactance circuit supplied with said rectangular voltage pulses and having a time constant short compared to the period of said synchronizing pulses but sufficiently long to yield transient response for pulse durations corresponding to a substantial operating range of relative phases of said signal pulses, a peak rectifier circuit supplied with the output wave of said reactance circuit through a coupling capacitor to thereby obtain a control wave varying with the difference between the average value of said output wave and peak values of one polarity thereof, and speed control means supplied with said control wave for controlling the speed of said motor, said control wave as applied to said speed control means having a polarity to yield synchronizing action during said operating range, whereby synchronism between scanning device and color filter element may be maintained with small phase deviation.

8. In a color television system employing a scanning device operating in synchronism with synchronizing signal pulses of predetermined periodicity, and a cooperating movable color filter element, apparatus for effecting synchronization therebetween which comprises a nonsynchronous motor driving said color filter element and a generator actuated therewith to produce local signal pulses of periodicity varying with the speed thereof and of said predetermined periodicity at synchronous speed, a phase-comparing circuit supplied with said synchronizing and local signal pulses and adapted to generate substantially rectangular voltage pulses whose duration varies with changes in phase between said signal pulses, a resistance-capacitance integrating circuit supplied with said rectangular voltage pulses and having a time constant short compared to the period of said synchronizing pulses but sufficiently long to yield transient response for pulse durations corresponding to a substantial operating range of relative phases of said signal pulses, a peak rectifier circuit including a shunting capacitor across the output thereof, circuit connections supplying the output wave of said integrating circuit to said rectifier circuit through a coupling capacitor to thereby obtain a smoothed control wave varying with the difference between the average value of said output wave and peak values of one polarity thereof, and speed control means supplied with said smoothed control wave for controlling the speed of said motor, the polarity of the smoothed control wave as applied to said speed control means being selected to yield synchronizing action during said operating range, whereby synchronism between scanning device and color filter element may be maintained with small phase deviation.

9. In a color television system employing a scanning device operating in synchronism with synchronizing signal pulses of predetermined periodicity, and a cooperating movable color filter element, apparatus for effecting synchronization therebetween which comprises a nonsynchronous motor driving said color filter element and a generator actuated therewith to produce local signal pulses of periodicity varying with the speed thereof and of said predetermined periodicity at synchronous speed, a phase-comparing circuit supplied with said synchronizing and local signal pulses and adapted to generate substantially rectangular voltage pulses whose duration varies with changes in phase between said signal pulses, a resistance-capacitance integrating circuit supplied with said rectangular voltage pulses and having a time constant short compared to the predetermined period of said synchronizing pulses but sufficiently long to yield transient response during rectangular pulses corresponding to a substantial operating range of relative phases of said signal pulses, a peak rectifier circuit supplied with the output wave of said integrating circuit through a coupling capacitor and having an output circuit time constant longer than said predetermined period, whereby a smoothed control wave varying with the difference between the average value of said output wave and peak values of one polarity thereof may be obtained, motor speed control means including a current-actuated speed control device and an electronic tube for controlling current thereto, and connections supplying said smooth control wave to said electronic tube in the polarity yielding synchronizing action during said operating range of relative phases, whereby synchronism between scanning device and color filter element may be maintained with small phase deviation.

10. In a color television system employing a scanning device operating in synchronism with synchronizing signal pulses of predetermined periodicity, and a cooperating movable color filter element, apparatus for effecting synchronization therebetween which comprises a nonsynchronous motor driving said color filter element and a generator driven thereby to produce local signal pulses of said predetermined periodicity at synchronous speed, a phase-comparing circuit supplied with said synchronizing and local signal pulses and adapted to generate substantially rectangular voltage pulses whose duration varies with changes in phase between said signal pulses, a resistance-capacitance integrating circuit supplied with said rectangular voltage pulses and having a time constant short compared to the predetermined period of said synchronizing pulses but sufficiently long to yield transient response during rectangular pulses corresponding to a substantial operating range of relative phases of said signal pulses, a peak rectifier circuit supplied with the output wave of said integrating circuit through a coupling capacitor and having an output circuit time constant longer than said predetermined period, whereby a smoothed control wave varying with the difference between the average value of said output wave and peak values of one polarity thereof may be obtained, motor speed control means including a current-actuated speed control device and an electronic tube for controlling current thereto, connections supplying said smoothed control wave to said electronic tube in the polarity yielding synchronizing action during said operating range of relative phases, and a feedback circuit responsive to variations in said control wave to feed back a control wave component in leading phase to at least partially compensate for lag between change of phase of said signals and resultant speed control, whereby synchronism between scanning device and color filter element may be maintained with small phase deviation.

11. In a color television system employing a scanning device operating in synchronism with synchronizing signal pulses of predetermined periodicity, and a cooperating movable color filter element, apparatus for effecting synchronization therebetween which comprises a nonsynchronous motor driving said color filter element and a generator driven therewith to produce local signal pulses of said predetermined periodicity at synchronous speed, a multivibrator supplied with said synchronizing and local signal pulses and actuated thereby between respective conditions of equilibrium to yield substantially rectangular voltage pulses whose duration varies with changes in phase between said signal pulses, a circuit including series resistance and capacitance elements supplied with said rectangular voltage pulses and having a time constant short compared to the predetermined period of the synchronizing pulses but sufficiently long to yield incomplete changing of voltage on said capacitance during rectangular pulses corresponding to a substantial operating range of relative phases of said signal pulses, a peak rectifier supplied with the voltage wave across one of said series elements through a coupling capacitor and having an output circuit time constant longer than said predetermined period, whereby a smoothed control wave varying with the difference between the average value of the voltage wave across said one element and peak values of one polarity thereof may be obtained, motor speed control means including a current-actuated speed control device and an electronic tube for controlling current thereto, and connections supplying said smoothed control wave to said electronic tube in the polarity yielding synchronizing action during said operating range, whereby synchronism between scanning device and color filter element may be maintained with small phase deviation.

12. In a color television system employing a scanning device operating in synchronism with synchronizing signal pulses of predetemined periodicity, and a cooperating movable color filter element, apparatus for effecting synchronization therebetween which comprises a nonsynchronous motor driving said color filter element and a generator driven therewith to produce local signal pulses of said predetermined periodicity at synchronous speed, a passive multivibrator actuated by said synchronizing and local signal pulses between respective conditions of stable equilibrium to produce substantially rectangular output voltage pulses of length determined by the relative phase of the signal pulses, a resistance-capacitance integrating circuit supplied with said rectangular pulses and having a time constant short compared to the period of said synchronizing pulses but sufficiently long to yield incomplete changing of voltage on said capacitance for pulse lengths corresponding to a substantial operating range of relative phases of said signal pulses, a cathode-follower circuit supplied with the voltage developed across said capacitance, a negative peak rectifier supplied with the output of said cathode-follower through a capacitor and having an anode output circuit including a resistance-capacitance circuit of time constant longer than said period to provide a smoothed control voltage, an electronic tube having a control grid supplied with said smoothed control voltage and a screen grid, a resistance-capacitance circuit connected to said screen grid to derive a leading anti-hunting voltage wave from said smoothed control voltage, circuit connections for feeding back said anti-hunting voltage wave to said rectifier whereby it appears as a voltage component at said control grid, and a saturable core reactor having an A.-C. winding connected in the power supply circuit to said motor and a D.-C. winding connected in the output circuit of said electronic tube to maintain synchronism of said motor within said operating range, whereby synchronism between said scanning device and color filter element may be maintained with small phase deviation therebetween.

13. In a color television system employing a scanning device operating in synchronism with synchronizing signal pulses of predetermined periodicity, and a cooperating movable color filter element, apparatus for effecting synchronization therebetween which comprises a nonsynchronous motor driving said color filter element and a generator driven therewith to produce local signal pulses of said predetermined periodicity at synchronous speed, a phase-comparing circuit supplied with said synchronizing and local signal pulses and adapted to generate substantially rectangular negatively-extending voltage pulses whose duration varies with changes in phase between said signal pulses, said rectangular pulses being positive to ground potential, a resistance-capacitance integrating circuit supplied with said rectangular pulses and having a time constant short compared to the period of said synchronizing pulses but sufficiently long to yield incomplete changing of voltage on said capacitance for pulse lengths corresponding to a substantial operating range of relative phases of said signal pulses, a cathode-follower circuit supplied with the voltage developed across said capacitance, a negative peak rectifier circuit supplied with the output of said cathode-follower through a coupling capacitor, and motor speed control means supplied with the output of said rectifier circuit, whereby synchronism between said scanning device and color filter element may be maintained with small phase deviation therebetween.

14. In a color television system emyloying a scanning device operating in synchronism with synchronizing signal pulses of predetermined periodicity, and a cooperating movable color filter element, apparatus for effecting synchronization therebetween which comprises a nonsynchronous motor driving said color filter element and a generator driven therewith to produce local signal pulses of said predetermined periodicity at synchronous speed, a passive multivibrator actuated by said synchronizing and local signal pulses between respective conditions of stable equilibrium to produce substantially rectangular output voltage pulses of length determined by the relative phase of the signal pulses, a resistance-capacitance integrating circuit supplied with said rectangular pulses and having a time constant short compared to the period of said synchronizing pulses but sufficiently long to yield incomplete changing of voltage on said capacitance for pulse lengths corresponding to a substantial operating range of relative phases of said signal pulses, a cathode-follower circuit supplied with the voltage developed across said capacitance, a negative peak rectifier supplied with the output of said cathode-follower through a capacitor and having an anode output circuit including a resistance-capacitance circuit of time constant longer than said period to provide a smoothed control voltage, motor speed control means including a current-actuated speed control device and an electronic tube for controlling current thereto, and connections supplying said smoothed control wave to said electronic tube to maintain synchronism of said motor within said operating range, whereby synchronism between said scanning device and color filter element may be maintained with small phase deviation therebetween.

15. In a color television system employing a scanning device operating in synchronism with synchronizing signal pulses of predetermined periodicity, and a cooperating movable color filter element, apparatus for effecting synchronization therebetween which comprises a nonsynchronous motor driving said color filter element and a generator actuated therewith to produce local signal pulses of periodicity varying with the speed thereof and of said predetermined periodicity at synchronous speed, a phase-comparing circuit supplied with said synchronizing and local signal pulses and adapted to generate substantially rectangular voltage pulses whose duration varies with changes in phase between said signal pulses, a resistance-capacitance circuit supplied with said rectangular voltage pulses and having a time constant short compared to the period of said synchronizing pulses but sufficiently long to yield transient response during rectangular pulses corresponding to a substantial range of relative phases of said signal pulses, a peak rectifier circuit supplied with the output wave of said integrating circuit through a coupling capacitor to obtain a smoothed control wave varying with the difference between the average value of said output wave and peak values of one polarity thereof, motor speed control means including a current-actuated speed control device and an electronic tube for controlling current thereto, said electronic tube having a control grid supplied with said smoothed control voltage and a screen grid, a resistance-capacitance circuit connected to said screen grid to derive a leading anti-hunting voltage wave from said smoothed control voltage, and circuit connections for feeding back said anti-hunting voltage wave whereby it appears as a voltage component at said control grid, whereby synchronism between said scanning device and color filter element may be maintained with small phase deviation.

16. In a color television system employing a scanning device operating in synchronism with synchronizing signal pulses of predetermined periodicity, and a cooperating movable color filter element, apparatus for effecting synchronization therebetween which comprises a nonsynchronous motor driving said color filter element and a generator actuated therewith to produce local signal pulses of periodicity varying with the speed thereof and of said predetermined periodicity at synchronous speed, a phase-comparing circuit supplied with said synchronizing and local signal pulses and adapted to generate substantially rectangular voltage pulses whose duration varies with changes in phase between said signal pulses, a resistance-capacitance integrating circuit supplied with said rectangular voltage pulses and having a time constant short compared to the predetermined period of said synchronizing pulses but sufficiently long to yield transient response during rectangular pulses corresponding to a substantial range of relative phases of said signal pulses, a peak rectifier circuit supplied with the output wave of said integrating circuit through a coupling capacitor and having an output circuit time constant longer than said predetermined period, whereby a smoothed control wave varying with the difference between the average value of said output wave and peak values of one polarity thereof may be obtained, motor speed control means including a current-actuated speed control device and an electronic tube for controlling current thereto, said electronic tube having a control grid supplied with said smoothed control voltage and a screen grid, a series resistor connected between the screen grid and a source of voltage therefor and a shunt capacitor connected to the circuit between said screen grid and series resistor whereby a leading anti-hunting voltage wave may be derived from said smoothed control voltage, and circuit connections for feeding back said anti-hunting voltage wave to said rectifier whereby it appears as a voltage component at said control grid, whereby synchronism between said scanning device and color filter element may be maintained with small phase deviation therebetween.

17. A system for synchronizing a nonsynchronous motor with a synchronizing signal of predetermined periodicity which comprises a generator actuated by said motor to produce a local signal whose periodicity is a function of the motor speed, a reactance circuit, an electrical circuit supplied with said synchronizing and local signals and adapted to apply and remove a voltage from said reactance circuit in accordance with the time phases of said signals, the reactance circuit time constant being shorter than the synchronizing signal period and yielding transient response over a substantial range of relative phases of said signals, an electrical circuit fed from said reactance circuit for producing a smoothed control wave whose value varies with the magnitude of said transient response over said range of phases, and speed control means supplied with said smoothed control wave for controlling the speed of said motor, whereby synchronization of said motor with small phase deviation may be obtained.

18. A system for synchronizing a nonsynchronous motor with synchronizing signal pulses of predetermined periodicity which comprises a pulse generator driven by said motor to produce local signal pulses of said predetermined periodicity at synchronous speed, a phase-comparing circuit supplied with said synchronizing and local signal pulses and adapted to generate substantially rectangular pulses whose duration varies with changes in phase between said signal pulses, a reactance circuit supplied with said rectangular pulses and having a time constant short compared to the period of said synchronizing pulses but sufficiently long to yield transient response for pulse durations corresponding to a substantial range of relative phases of said signal pulses, a rectifier circuit fed from said reactance circuit and adapted to produce a smoothed control wave whose value varies with the magnitude of the transient response over said range of phases, and speed control means supplied with said smoothed control wave for controlling the speed of said motor, whereby synchronization of said motor with small phase deviation may be obtained.

19. A system for synchronizing a nonsynchronous motor with synchronizing signal pulses of predetermined periodicity which comprises a pulse generator driven by said motor to produce local signal pulses of said predetermined periodicity at synchronous speed, a phase-comparing circuit supplied wtih said synchronizing and local signal pulses and adapted to generate substantially rectangular voltage pulses whose duration varies with changes in phase between said signal pulses, a resistance-capacitance integrating circuit supplied with said rectangular voltage pulses and having a time constant short compared to the period of said synchronizing pulses but sufficiently long to yield transient response for pulse durations corresponding to a substantial operating range of relative phases of said signal pulses, a peak rectifier circuit supplied with the output wave of said integrating circuit through a coupling capacitor to thereby obtain a control wave varying with the difference between the average value of said output wave and peak values of one polarity thereof, and motor speed control means supplied with said control wave to yield synchronizing action during said operating range of relative phases, whereby synchronization of said motor with small phase deviation may be obtained.

20. A system for synchronizing a nonsynchronous motor with synchronizing signal pulses of predetermined periodicity which comprises a pulse generator driven by said motor to produce local signal pulses of said predetermined periodicity at synchronous speed, a multivibrator supplied with said synchronizing and local signal pulses and actuated thereby between respective conditions of equilibrium to yield substantially rectangular voltage pulses whose duration varies with changes in phase between said signal pulses, a resistance-capacitance integrating circuit supplied with said rectangular pulses and having a time constant short compared to the period of said synchronizing pulses but sufficiently long to yield incomplete changing of voltage on said capacitance for pulse lengths corresponding to a substantial operating range of relative phases of said signal pulses, a cathode-follower circuit supplied with the voltage developed across said capacitance, a negative peak rectifier supplied with the output of said cathode-follower through a capacitor and having an anode output circuit including a resistance-capacitance circuit of time constant longer than said period to provide a smoothed control voltage, and motor speed control means supplied with said smoothed control voltage to maintain synchronism of said motor within said operating range, whereby synchronization of said motor with small phase deviation may be obtained.

21. A system for synchronizing a nonsynchronous motor with synchronizing signal pulses of predetermined periodicity which comprises a pulse generator driven by said motor to produce local signal pulses of said predetermined periodicity at synchronous speed, a phase-comparing circuit supplied with said synchronizing and local signal pulses and adapted to generate substantially rectangular voltage pulses whose duration varies with changes in phase between said signal pulses, a resistance-capacitance integrating circuit supplied with said rectangular voltage pulses and having a time constant short compared to the predetermined period of said synchronizing pulses but sufficiently long to yield transient response during rectangular pulses corresponding to a substantial range of relative phases of said signal pulses, a peak rectifier circuit supplied with the output wave of said integrating circuit through a coupling capacitor and having an output circuit time constant longer than said predetermined period, whereby a smoothed control wave varying with the difference between the average value of said output wave and peak values of one polarity thereof may be obtained, motor speed control means including a current-actuated speed control device and an electronic tube for controlling current thereto, said electronic tube having a control grid supplied with said smoothed control voltage and a screen grid, a series resistor connected between the screen grid and a source of voltage therefor and a shunt capacitor connected to the circuit between said screen grid and series resistor whereby a leading anti-hunting voltage wave may be derived from said smoothed control voltage, and circuit connections for feeding back said anti-hunting voltage wave to said rectifier whereby it appears as a voltage component at said control grid, whereby synchronization of said motor with small phase deviation may be obtained.

22. In a color television system employing a scanning device operating in synchronism with a synchronizing signal of predetermined periodicity, and a cooperating movable color filter element, apparatus for effecting synchronization therebetween which comprises a nonsynchronous motor driving said color filter element and a generator actuated therewith to produce a local signal of periodicity varying with the filter element speed, circuit means for developing a control wave whose value varies in accordance with changes in phase between said synchronizing and local signals, motor speed control means including an electronic tube having a control grid and screen grid, connections supplying said control wave to said control grid to thereby control the speed of said motor, a reactance circuit connected to said screen grid to derive a leading anti-hunting wave from said control wave, and circuit connections for feeding back said anti-hunting wave to said circuit means whereby it appears at said control grid along with said control wave but in leading phase with respect thereto.

23. In a color television system employing a scanning device operating in synchronism with a synchronizing signal of predetermined periodicity, and a cooperating movable color filter element, apparatus for effecting synchronization therebetween which comprises a nonsynchronous motor driving said color filter element and a generator actuated therewith to produce a local signal of periodicity varying with the filter element speed, a control wave generating circuit including a phase-comparing circuit supplied with said synchronizing and local signals and adapted to develop a control wave whose amplitude varies with changes in phase between said signals, motor speed control means including a current-actuated speed control device and an electron discharge tube for controlling current thereto, said electron discharge tube having a control grid supplied with said control wave to thereby control the speed of said motor, a screen grid in said tube having a resistor connected in series with a source of voltage therefor and a shunt capacitor connected between the screen grid and series resistor to a point of substantially fixed potential to develop a leading anti-hunting voltage wave from said control wave, and circuit connections for feeding back said anti-hunting wave to said control wave generating circuit whereby it appears at said control grid along with said control wave but in leading phase with respect thereto.

JOHN W. CHRISTENSEN.

REFERENCES CITED

The following references are of record in the file of this patent:

UNITED STATES PATENTS

| Number | Name | Date |
|---|---|---|
| 2,319,789 | Chambers | May 25, 1943 |
| 2,323,905 | Goldmark | July 13, 1943 |
| 2,378,746 | Beers | June 19, 1945 |
| 2,383,360 | Artzt | Aug. 21, 1945 |
| 2,399,421 | Artzt | Apr. 30, 1946 |
| 2,428,946 | Somers | Oct. 14, 1947 |
| 2,437,690 | Goldmark | Mar. 16, 1948 |
| 2,509,730 | Dome | May 30, 1950 |